US010684506B2

United States Patent
Yu et al.

(10) Patent No.: US 10,684,506 B2
(45) Date of Patent: Jun. 16, 2020

(54) DIRECT-TYPE BACKLIGHT MODULE AND LIQUID CRYSTAL DISPLAY

(71) Applicant: HUIZHOU CHINA STAR OPTOELECTRONICS TECHNOLOGY CO., LTD., Huizhou Guangdong (CN)

(72) Inventors: Gang Yu, Huizhou Guangdong (CN); Dehua Li, Huizhou Guangdong (CN)

(73) Assignee: HUIZHOU CHINA STAR OPTOELECTRONICS TECHNOLOGY CO., LTD., Huizhou, Guangdong (CN)

( * ) Notice: Subject to any disclaimer, the term of this patent is extended or adjusted under 35 U.S.C. 154(b) by 0 days.

(21) Appl. No.: 16/091,419

(22) PCT Filed: Sep. 12, 2018

(86) PCT No.: PCT/CN2018/105334
§ 371 (c)(1),
(2) Date: Oct. 4, 2018

(87) PCT Pub. No.: WO2019/205428
PCT Pub. Date: Oct. 31, 2019

(65) Prior Publication Data
US 2019/0339572 A1    Nov. 7, 2019

(30) Foreign Application Priority Data

Apr. 26, 2018  (CN) .......................... 2018 1 0388421

(51) Int. Cl.
*G02F 1/1333*      (2006.01)
*G02F 1/13357*     (2006.01)

(52) U.S. Cl.
CPC .. *G02F 1/133603* (2013.01); *G02F 1/133308* (2013.01); *G02F 1/133605* (2013.01);
(Continued)

(58) Field of Classification Search
CPC ......... G02F 1/133603; G02F 1/133308; G02F 1/133606; G02F 1/133602;
(Continued)

(56) References Cited

U.S. PATENT DOCUMENTS

| 2010/0103640 A1 | 4/2010 | Brown et al. |
| 2014/0111742 A1* | 4/2014 | Han ................ G02F 1/133504 349/64 |
| 2016/0342026 A1* | 11/2016 | Ma ..................... G02F 1/133606 |

FOREIGN PATENT DOCUMENTS

| CN | 204300864 U | 4/2015 |
| CN | 204328710 U | 5/2015 |

* cited by examiner

*Primary Examiner* — Angela K Davison
(74) *Attorney, Agent, or Firm* — Leong C. Lei

(57) ABSTRACT

The present disclosure relates to a direct-type backlight module and a liquid crystal display the direct-type backlight module includes a back frame, a backlight source, optical films and the elastic rope. The install pillars are arranged on the first edge and the second edge opposite to the first edge of the back frame. The backlight source is arranged within the back frame. The elastic rope and the install pillars cooperatively defines the supporting net opposite to the backlight source. The optical films are arranged on the supporting net, and thus may be supported by the supporting net. In this way, the optical films may be prevented from collapse, so as to exclude the diffusion plate. Not only the cost of the manufacturing process may be reduced, and the thin design of the backlight module may be realized.

16 Claims, 5 Drawing Sheets

(52) U.S. Cl.
CPC ............ *G02F 1/133606* (2013.01); *G02F 2001/133314* (2013.01); *G02F 2001/133607* (2013.01)

(58) Field of Classification Search
CPC ........ G02F 2001/133314; G02F 2001/133607; G02F 2001/133317
See application file for complete search history.

DIRECT-TYPE BACKLIGHT MODULE AND LIQUID CRYSTAL DISPLAY

RELATED APPLICATIONS

The present application is a National Phase of International Application Number PCT/CN2018/105334, filed Sep. 12, 2018, and claims the priority of China Application No. 201810388421.4 filed Apr. 26, 2018.

FIELD OF THE INVENTION

The present invention relates to a display field, and more particularly to a direct-type backlight module and a liquid crystal display.

BACKGROUND OF THE INVENTION

With the development of display technology, flat display devices, such as liquid crystal displays (LCDs), have been widely used in mobile phones due to their advantages of high picture quality, power saving, thin body, and wide application range. Various consumer electronic products, such as, televisions, personal digital assistants, digital cameras, notebook computers, and desktop computers have become mainstream in display devices.

Most of the liquid crystal display on the current market are backlight type liquid crystal display, which include a liquid crystal panel and a backlight module. The operation principle of the liquid crystal panel is to arrange liquid crystal molecules in two parallel glass substrates. There are many vertical and horizontal small wires in the middle of the two glass substrates. The liquid crystal molecules are controlled to change direction by being electrified, and the light of the backlight module is refracted so as to display the picture.

Since the liquid crystal panel itself does not emit light, the light source provided by the backlight module needs to display the image normally. Therefore, the backlight module is one of the key components of the liquid crystal display. The backlight module may include edge-type backlight modules and direct-type backlight modules according to the position of the light source. The direct-type backlight module is a backlight source, such as a cold cathode fluorescent lamp (CCFL) or a light emitting diode (LED) light source disposed behind the liquid crystal panel. After the light is homogenized by the diffusion plate, a surface light source is provided to the LCD panel.

The direct type backlight module has the advantages of high performance, good optical stability, and the like. The conventional direct-type backlight module generally includes a back frame, a backlight provided in the back frame, an optical film disposed at a distance from the backlight source, and a diffusion plate disposed below the optical film. The optical film includes a device for improving the propagation of light from a backlight source, such as a prism sheet and a diffusion sheet. The diffusion sheet is different from a diffusion plate, which does not have a supporting function in a film form. The diffusion plate is used for light emitted from a light source. Diffusion provides support for the optical film at the same time, but the diffusion plate material is thick and the cost is high. If the diffusion plate is omitted, the optical film will collapse downwards, which will cause the quality of the backlight film to decrease.

SUMMARY OF THE INVENTION

An objective of the present invention is to provide a direct-type backlight module to prevent the optical film from being collapsed. Thus, the diffusion plate may be omitted so as to reduce the manufacturing cost and to realize the thin design of the backlight module.

In one aspect, a direct-type backlight module includes: a back frame, a backlight source, optical films, and an elastic rope; and the back frame comprising a first edge and a second edge opposite to the first edge, and a plurality of install pillars being uniformly arranged on the first edge and the second edge in sequence, the backlight source being arranged within the back frame, the elastic rope and the install pillars cooperatively defining a supporting net opposite to the backlight source, and the optical films being arranged on the supporting net.

Wherein the direct-type backlight module further includes an elastic hook, and a fixing pillar corresponding to a front end or a tail end of the elastic rope, the fixing pillar is fixed on the back frame, one end of the elastic hook connects to the fixing pillar, and the other end of the elastic hook connects to the front end or the tail end of the elastic rope.

Wherein the elastic rope is made by rubber, and the elastic rope is transparent.

Wherein the optical films includes at least one prism sheet and at least one diffusion sheet being stacked together.

Wherein the elastic rope respectively bypass the install pillars to form the supporting net opposite to the backlight source.

Wherein the install pillars arranged on a first edge and the install pillars on the second edge are alternated arranged along a direction perpendicular to the first edge, the elastic rope sequentially alternately bypasses the install pillars on the first edge and the install pillars on the second edge to form the supporting net, each elastic rope bypasses one install pillar on the first edge and one install pillar on the second edge sequentially to form a net line that forms the supporting net, and the net lines in the supporting net have not crossed with each other.

Wherein the back frame is rectangular-shaped, and the first edge and the second edge are long edges of the back frame.

Wherein the install pillars arranged on a first edge and the install pillars on the second edge are alternated arranged along a direction perpendicular to the first edge, the elastic rope sequentially alternately bypasses the install pillars on the first edge and the install pillars on the second edge to form the supporting net, each elastic rope bypasses one install pillar on the first edge and one install pillar on the second edge sequentially to form a net line that forms the supporting net, and the net lines in the supporting net have crossed with each other except for the net lines being arranged in a rim of the supporting net.

Wherein the back frame is rectangular-shaped, and the first edge and the second edge are short edges of the back frame.

In view of the above, the direct-type backlight module includes a back frame, a backlight source, optical films and the elastic rope. The install pillars are arranged on the first edge and the second edge opposite to the first edge of the back frame. The backlight source is arranged within the back frame. The elastic rope and the install pillars cooperatively defines the supporting net opposite to the backlight source. The optical films are arranged on the supporting net, and thus may be supported by the supporting net. In this way, the optical films may be prevented from collapse, so as to exclude the diffusion plate. Not only the cost of the manufacturing process may be reduced, and the thin design of the backlight module may be realized. In addition, the thin design can also be realized by the liquid crystal display includes the backlight module.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Figure 1:
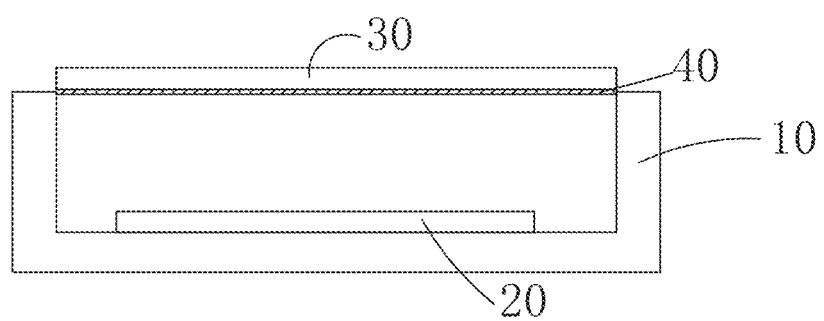
FIG. 1 is a cross-section view of the direct-type backlight module.

The following descriptions for the respective embodiments are specific embodiments capable of being implemented for illustrations of the present invention with referring to appended figures.

Referring to FIGS. 1 to 4, the direct-type backlight module includes a back frame 10, a backlight source 20, optical films 30, and an elastic rope 40.

The flexible substrate 10 includes a first edge and a second edge opposite to the first edge. A plurality of install pillars 11 are uniformly arranged on the first edge and the second edge. The backlight source 20 is arranged within the back frame 10. The elastic rope 40 and the install pillars 11 cooperatively define a supporting net opposite to the backlight source 20. The optical films 30 is arranged on the supporting net.

Figure 5:
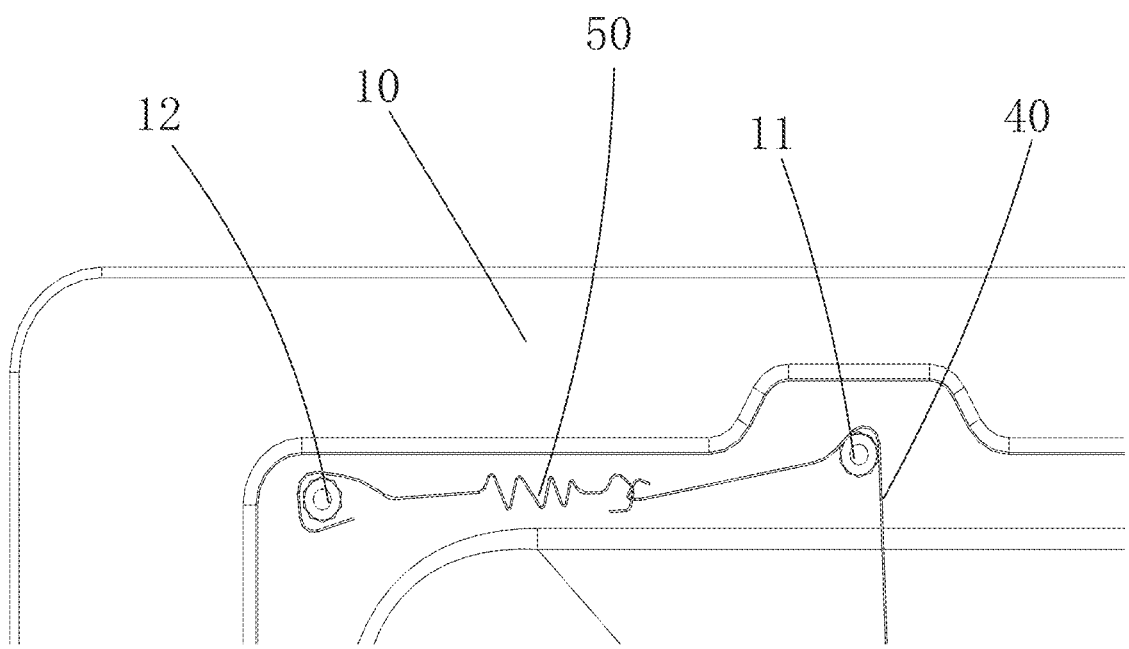
FIG. 5 is an enlarged view showing the front end or the tail end of the corresponding elastic rope of the direct-type backlight module in accordance with one embodiment of the present disclosure.

In an example, the elastic rope 40 is in an intense state after being configured as the supporting net so as to strongly support the optical films 30. As shown in FIG. 5, to prevent the elastic rope 40 from being loose caused by long-term tension, the direct-type backlight module further includes an elastic hook 50, and a fixing pillar 12 corresponding to the front end or the tail end of the elastic rope 40. The fixing pillar is fixed on the back frame. One end of the elastic hook 50 connects to the fixing pillar 12, and the other end of the elastic hook 50 connects to the front end or the tail end of the elastic rope 40. The tensioning force is added to the elastic rope 40 through the elastic hook 50 so that the elastic rope 40 can maintain the tension state for a long time, so as to avoid the optical films 30 from collapsing due to the softness of the elastic rope 40.

In an example, the elastic rope 40 is made by rubber. The color of the elastic rope 40 is determined according to whether the optical film 30 can cover the shadow of the elastic rope 40. Preferably, the elastic rope 40 is transparent or white.

In an example the optical films 30 includes a prism sheet and a diffuser stacked together.

In an example, the front end and the tail end of the elastic rope 40 are fixed on the fixing pillar 11, and preferably, the front end and the tail end of the elastic rope 40 are fixed on the install pillars 11 by tying.

In an example, the elastic rope 40 respectively bypass the plurality of install pillars 11 to form a support net disposed opposite to the backlight source 20.

Figure 2:
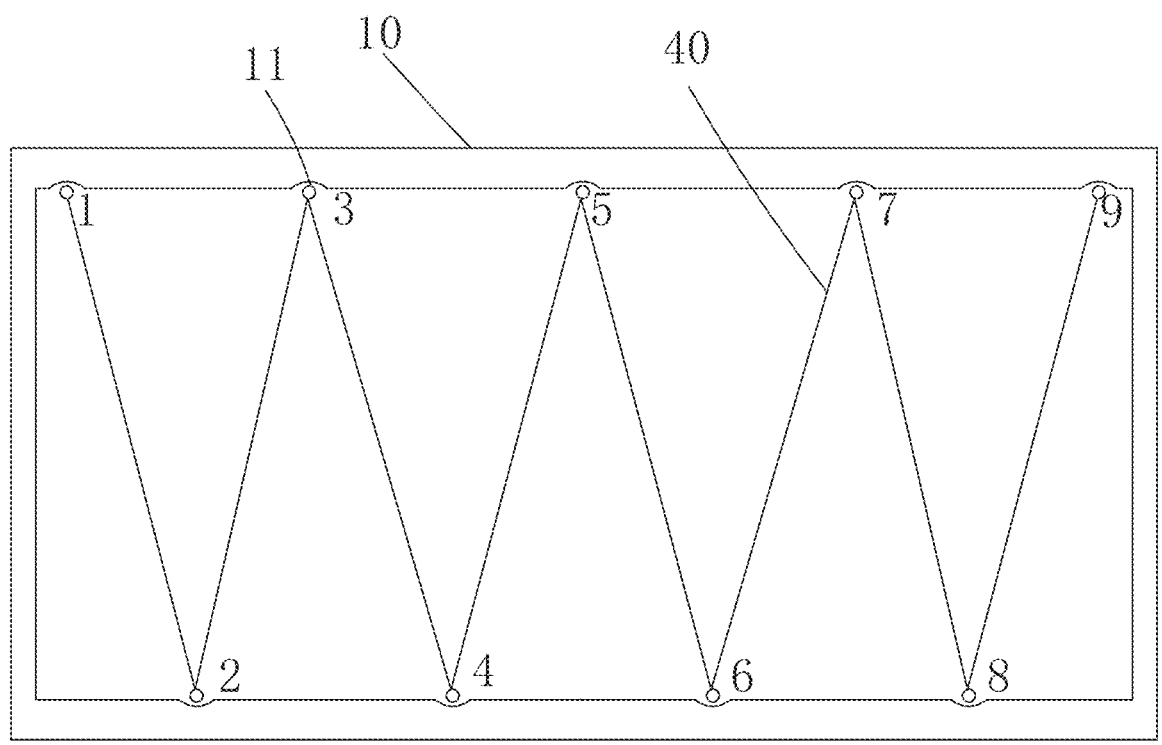
FIG. 2 is a top view of the direct-type backlight module in accordance with a first embodiment of the present disclosure.
Figure 4:
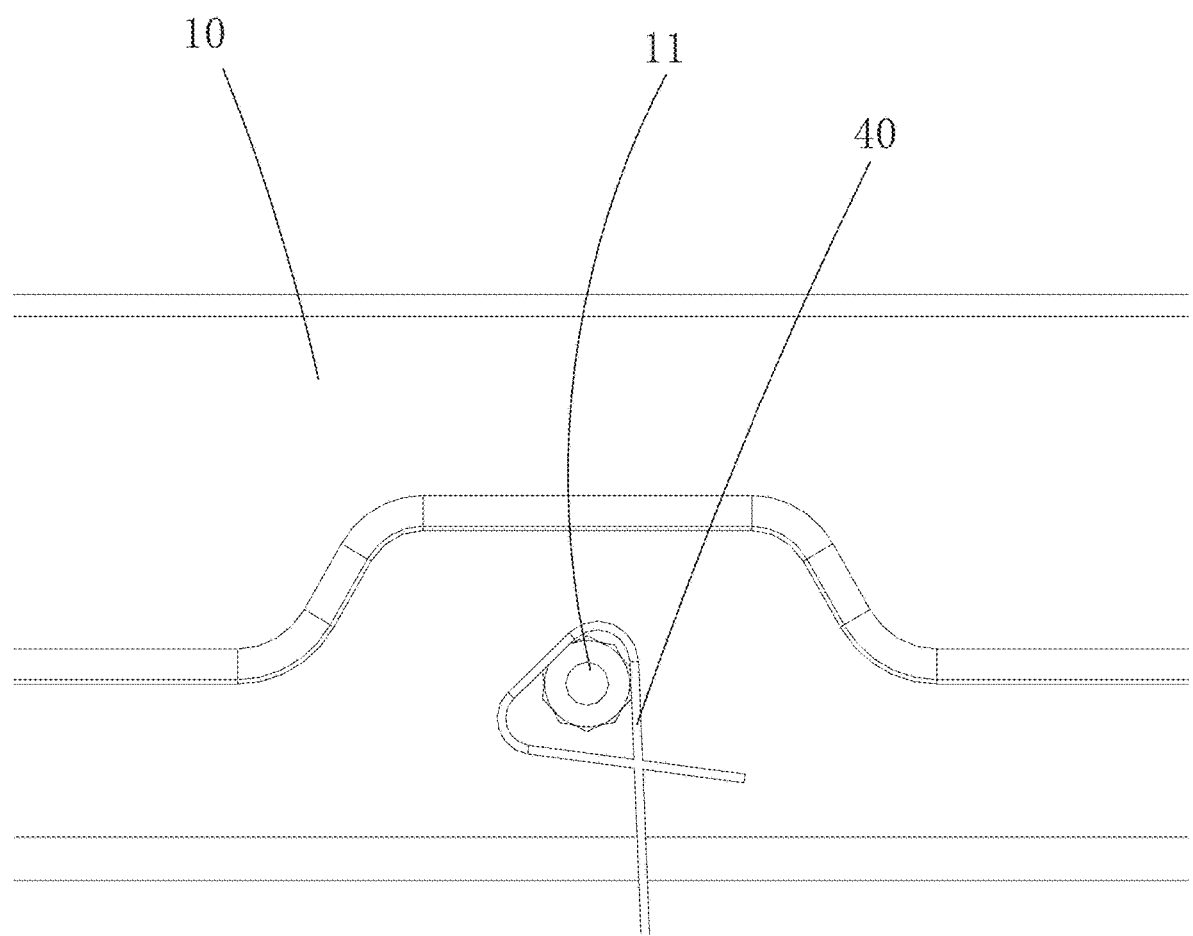
FIG. 4 is an enlarged view showing the corresponding install pillar of the direct-type backlight module in accordance with one embodiment of the present disclosure.

Referring to FIGS. 2 and 4, in the first embodiment, the install pillars 11 arranged on a first edge and the install pillars 11 on the second edge are alternated arranged along a direction perpendicular to the first edge. The elastic rope 40 sequentially alternately bypasses the install pillars 11 on the first edge and the install pillars 11 on the second edge to form the supporting net. Each elastic rope 40 bypasses one install pillar 11 on the first edge and one install pillar 11 on the second edge to form a net line that forms the supporting net. The net lines in the supporting net do not cross each other.

In the first embodiment, the back frame 10 is rectangular-shaped, and the first edge and the second edge are the long edges of the back frame 10.

As shown in FIG. 2, in the first embodiment, five install pillars 11 are installed on the first edge, and four install pillars 11 are installed on the second edge. The install pillars 11 in the first embodiment are respectively defined as a first install pillar 1, a second install pillar 2, a third install pillar 3, a fourth install pillar 4, a fifth install pillar 5, a sixth install pillar 6, a seventh install pillar 7, an eighth install pillar 8, a ninth install pillar 9, wherein the first install pillar 1, the third install pillar 3, the fifth install pillar 5, the seventh install pillar 7, and the ninth install pillar 9 are arranged on the first edge in sequence, and the second install pillar 2, the fourth install pillar 4, the sixth install pillar 6, and the eighth install pillar 8 are arranged on the second edge in sequence. The elastic rope 40 bypasses the first install pillar 1, the second install pillar 2, the third install pillar 3, the fourth install pillar 4, the fifth install pillar 5, the sixth install pillar 6, the seventh install pillar 7, the eighth install pillar 8, and the ninth install pillar 9 in turn to form the supporting net.

Figure 3:
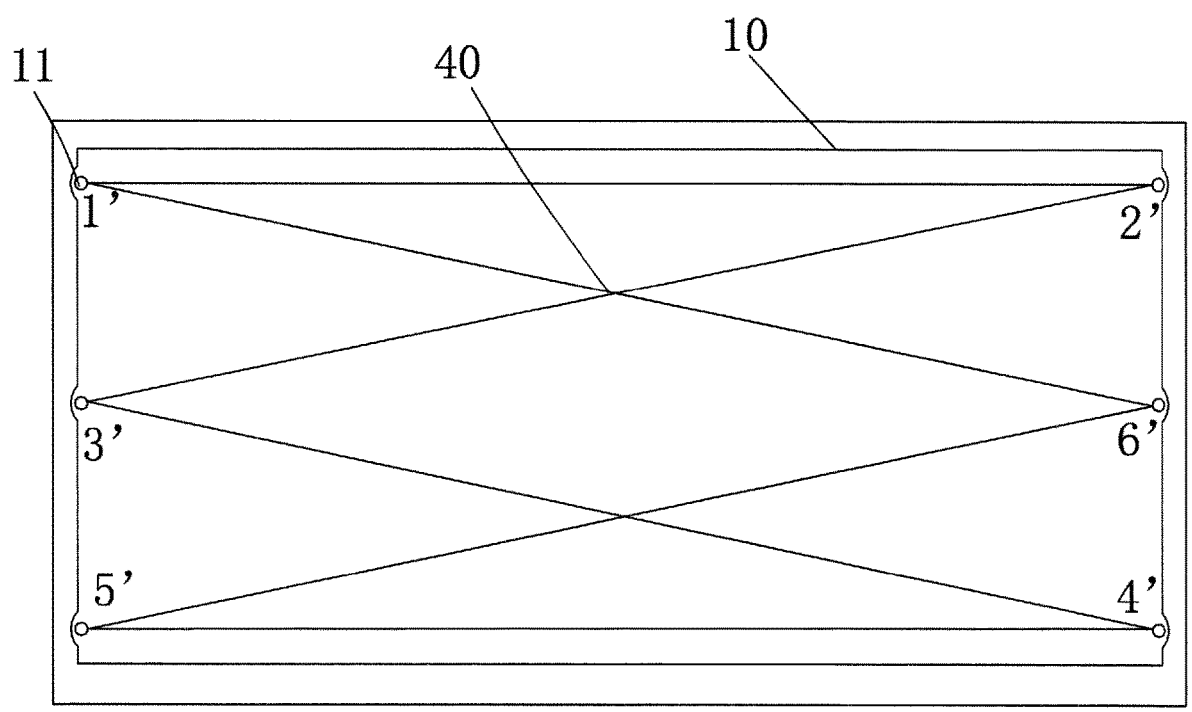
FIG. 3 is a top view of the direct-type backlight module in accordance with a second embodiment of the present disclosure.

Referring to FIGS. 3 and 4, in the second embodiment, the install pillars 11 arranged on a first edge and the install pillars 11 on the second edge are alternated arranged along a direction perpendicular to the first edge. The elastic rope 40 sequentially alternately bypasses the install pillars 11 on the first edge and the install pillars 11 on the second edge to form the supporting net. Each elastic rope 40 bypasses one install pillar 11 on the first edge and one install pillar 11 on the second edge to form a net line that forms the supporting net. The net lines in the supporting net, except for the two net lines arranged in a rim of the supporting net, cross each other.

In the second embodiment, the back frame 10 is rectangular-shaped, and the first edge and the second edge are the short edges of the back frame 10.

As shown in FIG. 3, three install pillars 11 are installed on the first edge, and three install pillars 11 are installed on the second edge. The install pillars 11 in the second embodiment are respectively defined as a first install pillar 1', a second install pillar 2', a third install pillar 3', a fourth install pillar 4', a fifth install pillar 5', and a sixth install pillar 6', wherein the first install pillar 1', the third install pillar 3', and the fifth install pillar 5' are arranged on the first edge in sequence, and the second install pillar 2', the fourth install pillar 4', the sixth install pillar 6' are arranged on the second edge in sequence. The elastic rope 40 bypasses the first install pillar 1', the second install pillar 2', the third install pillar 3', the fourth install pillar 4', the fifth install pillar 5', and the sixth install pillar 6' in turn, and then round back the first install pillar 1' to form the supporting net, wherein the net line connecting the first install pillar 1' and the sixth install pillar 6' crosses with the net line connecting the second install pillar 2' and the third install pillar 3, and the net line connecting the third install pillar 3' and the fourth install pillar 4' crosses with the net line connecting the fifth install pillar 5' and the sixth install pillar 6'.

Therefore, in the direct-type backlight module of the present disclosure, the supporting net formed by the plurality of install pillars 11 is bypassed by the elastic rope 40, and the optical films 30 are disposed on the supporting net. The diffusion plate can be omitted afterwards. Still, the optical film 30 are prevented from collapse, thereby reducing the thickness of the direct-type backlight module and reducing the cost of the direct-type backlight module.

In one embodiment, the liquid crystal display includes the above direct-type backlight module. Further, the liquid crystal display includes a front frame engaged with the direct-type backlight module and a liquid crystal panel arranged between the direct-type backlight module and the front frame.

In view of the above, the direct-type backlight module includes a back frame, a backlight source, optical films and the elastic rope. The install pillars are arranged on the first edge and the second edge opposite to the first edge of the back frame. The backlight source is arranged within the back frame. The elastic rope and the install pillars cooperatively defines the supporting net opposite to the backlight source. The optical films are arranged on the supporting net, and thus may be supported by the supporting net. In this way, the optical films may be prevented from collapse, so as to exclude the diffusion plate. Not only the cost of the manufacturing process may be reduced, and the thin design of the backlight module may be realized. In addition, the thin design can also be realized by the liquid crystal display includes the backlight module.

Above are embodiments of the present invention, which does not limit the scope of the present invention. Any equivalent amendments within the spirit and principles of the embodiment described above should be covered by the protected scope of the invention.

What is claimed is:

1. A direct-type backlight module, comprising:
   a back frame, a backlight source, optical films, and an elastic rope;
   the back frame comprising a first edge and a second edge opposite to the first edge, and a plurality of install pillars being uniformly arranged on the first edge and the second edge in sequence, the backlight source being arranged within the back frame, the elastic rope and the install pillars cooperatively defining a supporting net opposite to the backlight source, and the optical films being arranged on the supporting net; and
   an elastic hook, and a fixing pillar corresponding to a front end or a tail end of the elastic rope, the fixing pillar is fixed on the back frame, one end of the elastic hook connects to the fixing pillar, and the other end of the elastic hook connects to the front end or the tail end of the elastic rope.

2. The direct-type backlight module as claimed in claim 1, wherein the elastic rope is made of rubber, and the elastic rope is transparent.

3. The direct-type backlight module as claimed in claim 1, wherein the optical films comprise at least one prism sheet and at least one diffusion sheet being stacked together.

4. The direct-type backlight module as claimed in claim 1, wherein the elastic rope passes over the install pillars to form the supporting net opposite to the backlight source.

5. The direct-type backlight module as claimed in claim 4, wherein the install pillars arranged on the first edge and the install pillars on the second edge are alternately arranged along a direction perpendicular to the first edge, the elastic rope sequentially alternately passes over the install pillars on the first edge and the install pillars on the second edge to form the supporting net.

6. The direct-type backlight module as claimed in claim 5, wherein the back frame is rectangular-shaped, and the first edge and the second edge are long edges of the back frame.

7. The direct-type backlight module as claimed in claim 4, wherein the install pillars arranged on the first edge and the install pillars on the second edge are alternately arranged along a direction perpendicular to the first edge, the elastic rope sequentially alternately passes over the install pillars on the first edge and the install pillars on the second edge to form the supporting net.

8. The direct-type backlight module as claimed in claim 7, wherein the back frame is rectangular-shaped, and the first edge and the second edge are short edges of the back frame.

9. A liquid crystal display comprises the direct-type backlight module as claimed in claim 1, wherein the direct-type backlight module further comprises an elastic hook, and a fixing pillar corresponding to a front end or a tail end of the elastic rope, the fixing pillar is fixed on the back frame, one end of the elastic hook connects to the fixing pillar, and the other end of the elastic hook connects to the front end or the tail end of the elastic rope.

10. The liquid crystal display as claimed in claim 9, wherein the elastic rope is made of rubber, and the elastic rope is transparent.

11. The liquid crystal display as claimed in claim 9, wherein the optical films comprise at least one prism sheet and at least one diffusion sheet being stacked together.

12. The liquid crystal display as claimed in claim 9, wherein the elastic rope respectively passes over the install pillars to form the supporting net opposite to the backlight source.

13. The liquid crystal display as claimed in claim 12, wherein the install pillars arranged on the first edge and the install pillars on the second edge are alternately arranged along a direction perpendicular to the first edge, the elastic rope sequentially alternately passes over the install pillars on the first edge and the install pillars on the second edge to form the supporting net.

14. The liquid crystal display as claimed in claim 13, wherein the back frame is rectangular-shaped, and the first edge and the second edge are long edges of the back frame.

15. The liquid crystal display as claimed in claim 12, wherein the install pillars arranged on the first edge and the install pillars on the second edge are alternately arranged along a direction perpendicular to the first edge, the elastic rope sequentially alternately passes over the install pillars on the first edge and the install pillars on the second edge to form the supporting net.

16. The liquid crystal display as claimed in claim 15, wherein the back frame is rectangular-shaped, and the first edge and the second edge are short edges of the back frame.

\* \* \* \* \*